United States Patent [19]
Eriksson

[11] 3,884,334
[45] May 20, 1975

[54] SCREW THREAD CUTTING APPARATUS

[75] Inventor: Alf A. A. Eriksson, Nacka, Sweden

[73] Assignee: Aktiebolaget Svenska Precisionsvertyg, Nacka, Sweden

[22] Filed: Oct. 17, 1973

[21] Appl. No.: 407,095

[30] Foreign Application Priority Data
Oct. 26, 1972 Sweden............................ 13880/72

[52] U.S. Cl............................ 192/56 R; 81/52.4 A
[51] Int. Cl............................................. F16d 43/20
[58] Field of Search........ 192/56 R, 150; 81/52.4 R, 81/52.4 A; 173/146; 64/29

[56] References Cited
UNITED STATES PATENTS
| | | | |
|---|---|---|---|
| 2,940,571 | 6/1960 | Bernhard | 192/56 R |
| 3,032,156 | 5/1962 | Eriksson | 192/56 R |

*Primary Examiner*—Allan D. Herrmann
*Attorney, Agent, or Firm*—Shlesinger, Fitzsimmons & Shlesinger

[57] ABSTRACT

The invention relates to adaption to a reversible construction of a screw thread cutting apparatus of the general type comprising a driving part connectable to the spindle of a machine tool, a driven part carrying the thread cutting tap and torque transmitting clutch elements which are in engagement by opposed drivers in the thread cutting operation, but are disengaged when upon completion of said operation the apparatus is withdrawn from the threaded hole and reset to engaging position without any interruption of the drive proper when starting the next thread cutting operation. This resetting movement affords particular difficulties in reversible screw thread cutting apparatuses where the clutch element associated with the driven part always rotates with the same speed in the same direction. The invention provides means to ensure correct re-engagement of the drivers of the clutch elements upon withdrawal of the apparatus from the threaded hole so that the apparatus can immediately be employed for cutting the threads in the next hole to be provided with threads.

2 Claims, 6 Drawing Figures

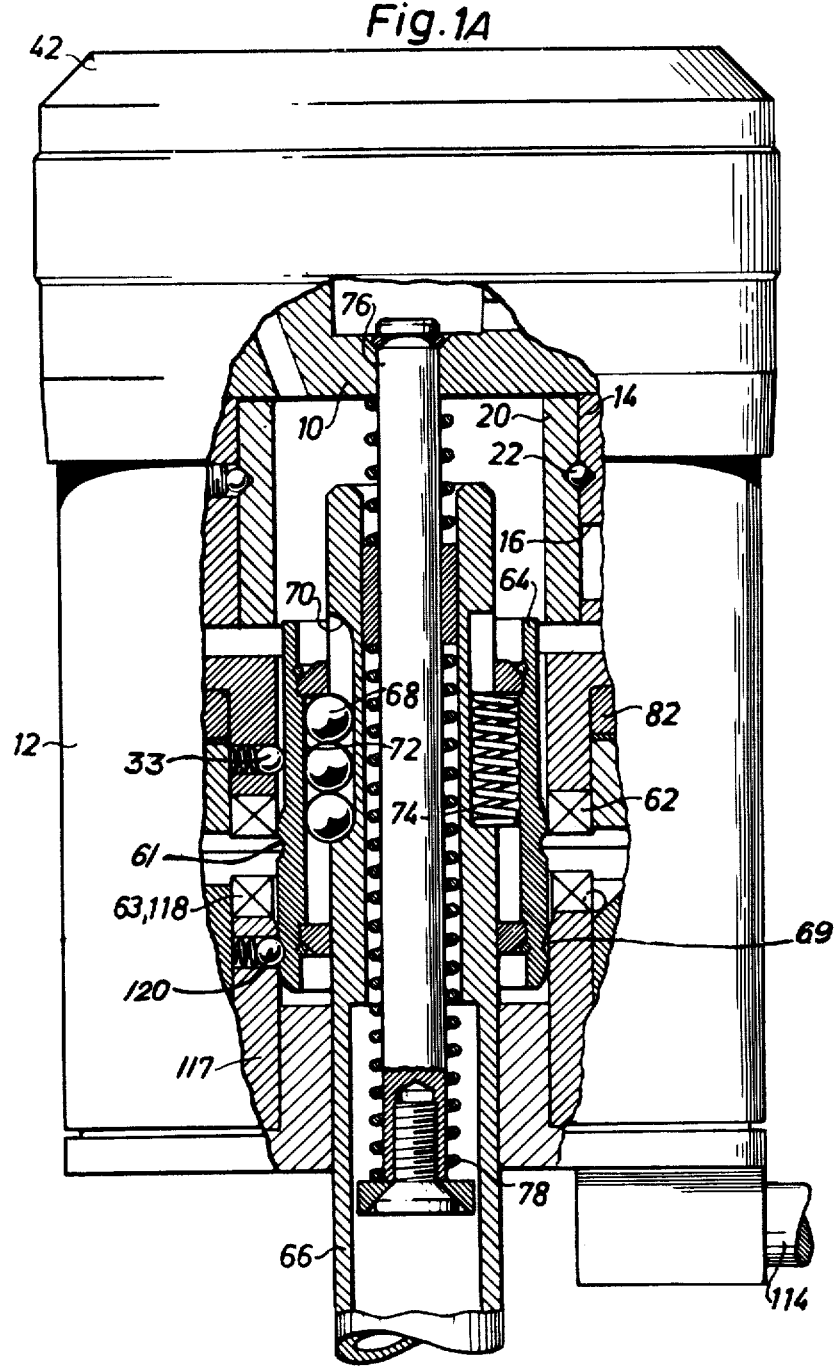

SCREW THREAD CUTTING APPARATUS

FIELD OF THE INVENTION

This invention relates to a screw thread cutting device of the reversible type.

More particularly this invention relates to a screw thread cutting device comprising a driving part, a driven part and clutch elements disposed therebetween and formed with drivers which during transfer of torque between said parts engage one another, but which on excess of a predetermined value of the torque disengage from one another by axial displacement of the one element against the action of spring members.

THE PRIOR ART

In accordance with the disclosure by, e.g., the U.S. Pat No. 3,032,156 there are further torque transferring locking members provided in recesses formed partly in said lastmentioned element and partly in one of the said parts of which recesses the recess formed in the element has a portion with an extension in the peripheral direction and further comprises a guide surface for the locking element with a rise in axial direction. In its operation the element is under the action of friction members which after disengagement brake the element and cause the clutch members to pass from the clutch transferring position over onto the guide surface to bring the drivers apart completely.

During the cutting of screw threads in dead end holes the screw cut is practically completely relieved from the torque when the tap has reached the bottom of the hole. The known construction is of the non-reversing type, i.e., the direction of rotation of the driving part must be reversed in order that the screw tap can be threaded back out of the finished screw thread in the work piece. Hereunder no difficulties arise during the return movement of the locking member along the guide surface, and in particular the drivers of the clutch elements will always return to correct mutual engagement. As is easily understood the torque emanating from the friction members acts now in the opposite direction which thus coincides with the direction of the return movement of the locking members along the guide surface.

BACKGROUND OF THE INVENTION

For apparatuses with built-in means for reversed drive quite different conditions exist due to the fact that the driving part continuously rotates with the same speed and in the same direction. Upon disengagement the clutch member equipped with the peripheral guide surface for the locking member must be accelerated to higher speed in order that the locking member shall leave said guide surface and return into the torque transferring position. Even if the clutch element by suitable mutual adaption of the slope of the guide surface and the spring force acting on the element functions in correct manner, the drivers formed as projections with inclined surfaces have often upon reversal not returned into their engaging positions but disengaged instead when the next following screw threading operation was started.

OBJECTS AND ADVANTAGES OF THE INVENTION

Thus, one main object of the invention is to solve this problem by providing means ensuring the return of the clutch members into the clutch engagement position.

Another object of the invention is to provide a reversible screw thread cutting apparatus possessing a substantially greater capacity than has been possible impart thereto earlier inspite of substantially unchanged wear.

Still another object of the invention is to provide a reversible screw thread cutting apparatus with a small dimensioned thread cutting tap where the spring force available for the resetting of the axially movable clutch member is relatively feeble.

MAIN FEATURES OF THE INVENTION

According to a main feature of the reversible screw thread cutting apparatus of the type defined hereinbefore, the second clutch element of the apparatus comprises two concentrically arranged element parts within limits rotatable relative to one another of which element parts one is disposed for cooperation with the friction members and the other is formed with the drivers so as upon reversal of the apparatus to cause the last-mentioned element part to be accelerated to higher speed by the friction moment exerted by the friction members assisted by the friction moment exerted on the first-mentioned element part and thereby to ensure that the drivers of the two clutch members always return to the clutch engagement position.

According to a particularly suitable embodiment of the invention there is provided between the two element parts a spring member disposed to be loaded by the action of the moment produced by the friction members.

SHORT DESCRIPTION OF THE DRAWINGS

Further objects and advantages of the invention will become apparent from the following description considered in connection with the accompanying drawings, which form part of this specification, and of which:

FIG. 1A is a partial axial sectional view similar to FIG. 1 but showing the apparatus in its reverse drive position:

DESCRIPTION OF THE PREFERRED EMBODIMENT

Figure 1:
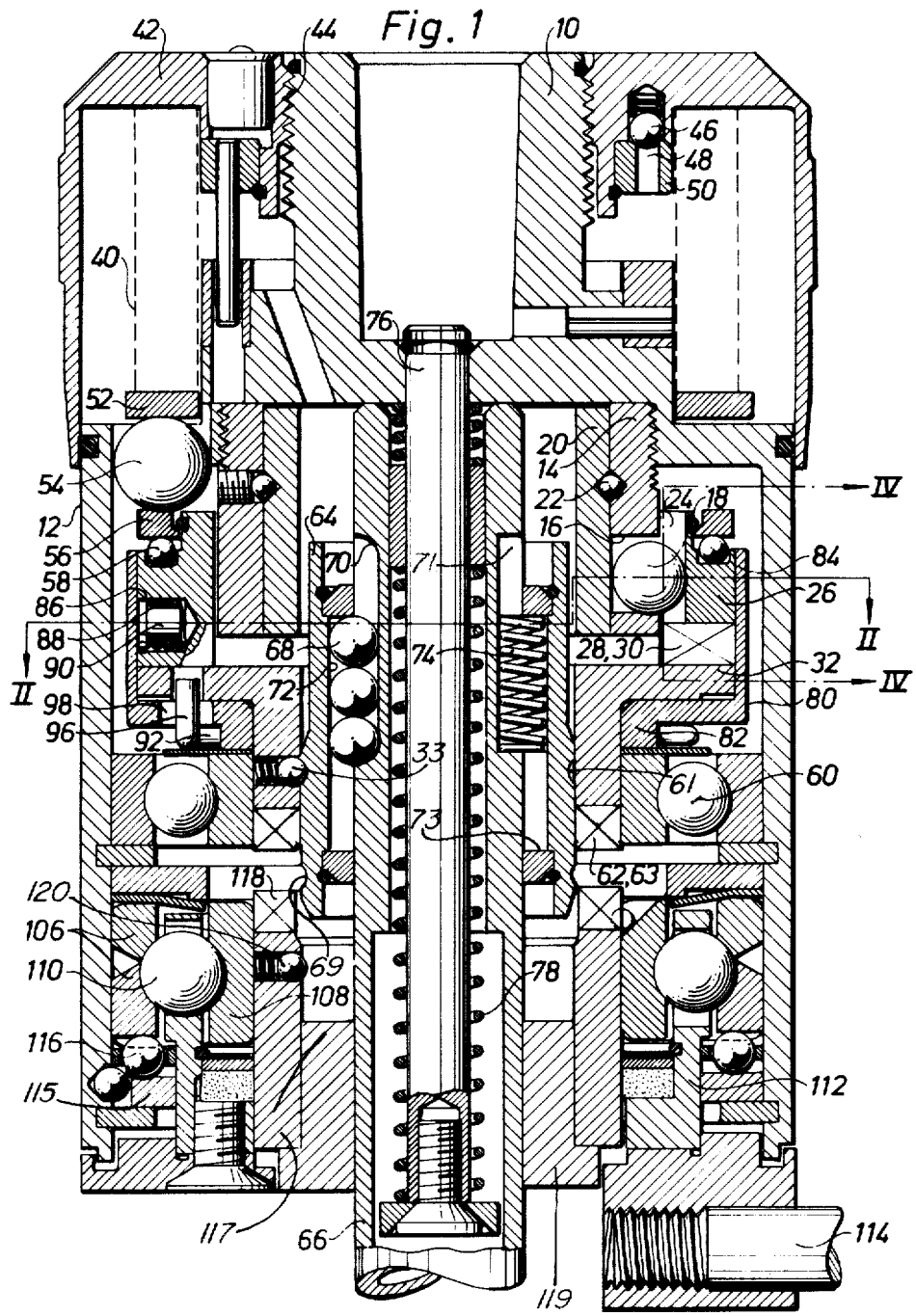
FIG. 1 is an axial sectional view taken along the line I—I of FIG. 2 through a screw thread cutting device embodying the invention.
Figure 2:
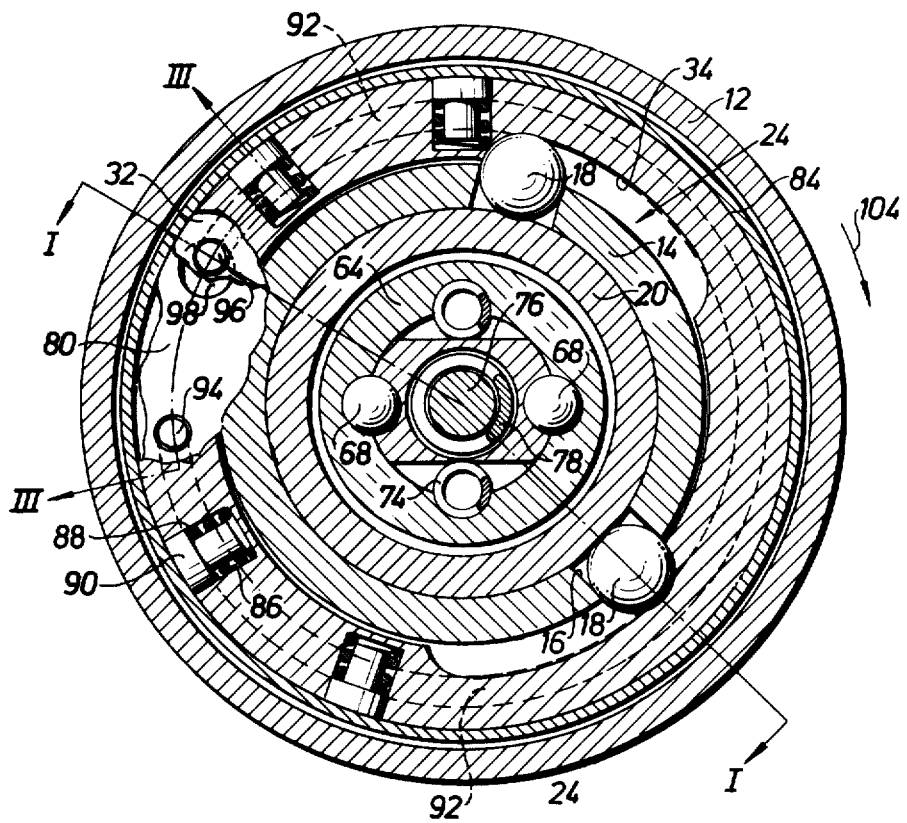
FIG. 2 is a sectional view taken along the line II—II of FIG. 1.
Figure 3:
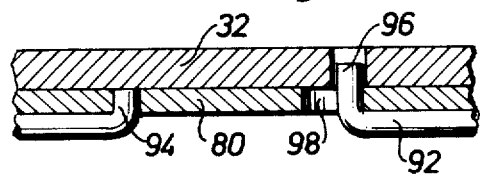
FIG. 3 is a fragmentary sectional view taken along the peripheral line III—III of FIG. 2.

Referring now to the drawings and in particular FIGS. 1 and 2, reference numeral 10 denotes a driving clutch or taper which is intended to be connected to the driving spindle of a machine tool and which widens into a sleeve-formed portion 12. A driving sleeve 14 is fixedly united with the driving taper 10. The sleeve 14 is formed with several radial bores 16, which number is three in the illustrated embodiment. Each bore fits to an associated locking member which in the shown embodiment has a shape of a ball 18, but may also be a roller, pin or similar element. These balls are internally guided by a sleeve 20 which by means of a ring of bearing balls 22 is mounted axially fixed, but peripherally easily rotatable on the driving sleeve 14. To form a roller for the balls 22 the two sleeves are formed with grooves facing one another and adapted to fit to the balls.

The balls 18 are retained so as partly to project out of the bores 16 and into engagement with a recess 24 which is formed in the inner surface of a clutch element 26. Thus the element 26 has three recesses 24, one for each ball 18. The clutch elements 26 is at its lower side provided with a number of drivers or projections 28 evenly distributed about the circumference and formed for cooperation with drivers or projections 30 on a lower clutch element 32. As is best seen from the FIGS. 4 and 5, each recess 24 has two portions extending at an angle relatively to one another, the one portion denoted 34 extending to a limited extent in peripheral direction and having a guide surface 36 extending with a predetermined rise relative the plane of rotation, and the other portion 38 extending axially or, if desired, with some inclination thereto. When the balls 18 are in the axial portion 38 of the grooves, torque is transmitted from the sleeve 14 to the balls 18 and therefrom to the clutch element 26.

The clutch element 26 is under axial pressure from several, e.g., three, of screw spring members 40 which are positioned in a hood or cap 42 which can be adjusted in axial direction relative the driving cone 10 by means of threads 44 formed therebetween. The hood is retained in desired position by means of one or several spring loaded balls 46 which catch axial recesses 48 distributed evenly about the circumference of a part 50 rotationally fixedly united with the driving cone 10. The springs 40 bear against an annular cap 52 which bears against several, such as three, balls 54 evenly spaced over the circumference. These balls may in turn bear against an annular member 56 which through a row of smaller balls 58 press against the clutch member 26. The axial pressure with which the drivers 28 of the element 26 bear against the drivers or projections 30 of the lower clutch member 32 is thus controlled by greater or less compression of the screw springs 40.

The lower clutch member 32 is supported by the driving part 12 by means of a combined radial thrust bearing 60 so as to be adapted to rotate relatively to said element. When the projections or teeth of the clutch elements 26, 32 are in engagement with one another and a screw thread cutting operation is effected, the torque is transmitted to the clutch element 32 and therefrom to a sleeve 64. In this operative position the element 32 and the sleeve 64 are interconnected by means of a ring of coupling projections or teeth 62, and 63. From the sleeve 64 the torque is transmitted to the driven spindle 66 of the screw thread cutting apparatus which spindle carries the thread cutting tap. The torque transfer between the parts 64, 66 is effected by means of balls 68 which are movably inserted into axially extending grooves 70, 72 formed one in each of said two parts. Other grooves house in known manner return spring members 74. The driven spindle 66 is guided by a central bolt 76 which is rigidly secured onto the driving part 10 and which is surrounded by a screw spring member 78. This spring member tends to return the driven spindle 66 to the shown axial position in which either the spindle or the part 10 is guided in a direction away from the other part.

According to the invention, the clutch element 32 is divided so as to comprise also an element portion 80 having a relatively low weight. The element portion 80 has a hub portion 82 which fits to a shoulder on the element 32 and a sleeve-formed part 84 extending over the clutch element 26. This latter element 26 is formed with several radial bores adapted to house taps 90 which are urge in outward direction by means of springs 88 and which bear against the interior surface of the sleeve 84 and which function as friction members. According to the invention, the element parts 32, 80 are peripherally movable relatively one another to a limited extent which in the shown embodiment is brought about by means of a wire spring 92 which may extend over the major part of the circumference within the free space below the element part 80 and which with its one end 94 bent out axially enters the element portion 80 and with its other end 96 the clutch element 32. In this connection, said second end has a possibility of free peripheral motion to a limited extent due to the fact that the element part 80 has a bore 98 of, e.g., circular shape and with substantially greater diameter than the diameter of the wire spring.

Figure 4:
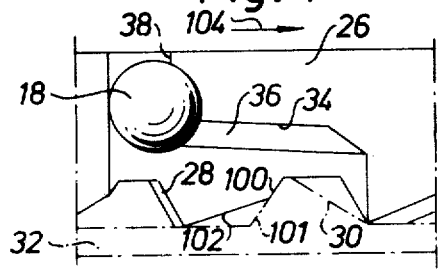
FIGS. 4 and 5 show perspective views of portions of a clutch element and a locking member forming part of the device shown in FIGS. 1 and 2 and represented in two different operational positions, said Figures being lateral views in the direction of the arrows IV—IV in FIG. 1.

During forward driving operation of the apparatus the torque is transferred as stated above from the driving cone 10 via the sleeve 14, the balls 18, the clutch element 26, the drivers or teeth 28, 30, the clutch element 32, the coupling 62, 63, the sleeve 64 and the balls 68 to the driven spindle 66 which carries the thread cutting tap. When the tap has reached the bottom of the hole to be provided with threads, the spindle 66 and therewith the clutch elements 32, 80 come to a stand-still whereas the clutch element 26 is forced upwards against the action of the springs 40 by the feature that the drivers or cams 28, 30 part from one another. The cams are formed with an edge portion 100 possessing a relatively steep slope which may be of the same order of magnitude as the slope of the entire edge portions 101 of the lower cams or drivers 30. These portions engage one another when torque is transmitted as is illustrated in FIG. 4. Thereafter follows a less steep portion 102 of the cams or drivers 28 which however, still has a relative great slope or inclination towards the plane of rotation. In a lateral view the cams or drivers 30 have triangular shape. When the clutch element 32 has come to a stand-still, the element 26 continues in the direction of rotation 104 and the projections or cams 28 glide with their portions 102 upwards to the ridges of the projections or cams 30. Simultaneously, the balls 18, which are fixed axially by the bores 16 in the driving sleeve 14, arrive at the level of the shallower peripheral groove portions 34, along the sloping guide surfaces 36 of which they roll upwards and thereby completely separate the projecting drivers or cams 28, 30 from one another. Since the clutch part 26 continues to rotate, the friction produced by the projections 90 acting on the sleeve 84 results in a torque which causes the element part 80 to be displaced peripherally in relation to the element part 32 while loading the wire spring 92. The relative movement produced in this way between the two parts 80, 32 is limited by the diameter size of the hole 98 in the element part 80.

After the thread cutting tap and the spindle 66 have come to a stand-still upon completion of a threaded hole the apparatus is reversed. The balls 68 allow sleeve 64 to shift vertically with part 10 relative to the spindle 66 until the locking ring 73 in sleeve 64 engages the springs 74 and compresses them against the shoulders 71 at the upper ends of grooves 70. The spring 74 then urges sleeve 64 axially downwardly on sleeve 66 and relative to member 32 to the position shown in FIG. 1A, wherein the teeth 63 on the sleeve 64 are disengaged from the teeth 62 on the lower end of element 32, and are instead drivingly engaged with the teeth 118 formed on the upper end of sleeve 117, which is carried by sleeve 119, that surrounds spindle 66. The sleeve 64 is held releasably in its forward (FIG. 1) or reverse (FIG. 1A) positions by the spring-loaded ball detents 33 and 120 which engage, respectively, in spaced recesses 61 and 69, which are formed in the outer periphery of sleeve 64.

When the sleeve 64 is in its lower operating position as shown in FIG. 1A, and spindle 66 is driven in a reverse direction. For this purpose it is provided in known manner with a preferably split ring 106 which with respect to rotation is fixedly connected to the driving part 12. Provided between this split ring and an inner ring 108 is a row of balls 110 which are retained rotationally stationary by means of a ball retainer 112 and an arm 114 connected to said retainer. The split ring 106 is axially loaded at this time by means of balls 116. These are known per se, e.g., from the U.S. Pat. No. 3,191,449. Whereas the driving part 12 remains unchanged in its direction of rotation, the rings 108, 117, and the associated clutch element 118 will rotate in the opposite direction, while carrying the spindle 66 along with them in this rotation in the opposite direction. In this way the tap is threaded upwards and thus leaves the hole formed with threads.

As soon as the clutch element 32 is relieved from direct drive of the thread cutting tap through the coupling 62, 63, the clutch element 26 can begin to return to position of engagement. The resetting movement is effected in two stages, during the first of which the balls 18 roll backwards along the guide surfaces 36. The drivers or cams 30 of the element 26 approach the drivers or cams of the element 32 to come to mutual engagement as soon as the balls have reached the axial grooves 38. This first stage is rendered possible by the slope or inclination of the guide surfaces 36 and the axial pressure emanating from the spring members 40. The peripheral force which accelerates the clutch element 26 relative to the driving part 14 is determined by adaption to one another of the angle of slope or inclination and the spring force.

If the drivers or cams in that moment when they are engaging one another are opposite the clearings between two teeth of the opposite clutch element according to FIG. 4, the reengagement can be effected immediately. If the cams 28 of the upper element 26 meet the cams 30 of the lower element 32 at the front side of the latter which thus is the first in the direction of rotation, a clutch coupling to the position shown in FIG. 4 is also effected without difficulty by the upper cams sliding down along the front of the lower cams. However, if the upper cams 28 with their surfaces 102 meet the ridges of the lower cams 30, a disengagement of the clutch elements 26, 32 should occur if the element 26 due to its higher speed would be allowed to slide upwards on the lower cams. This non-desired effect is positively prevented according to the invention by the lower clutch element consisting of the two element parts 32, 80. The part 32 can now be imparted additional speed so that it rotates with a higher speed than the clutch element 26, until the correct cam engagement has been obtained. This result is obtained by the feature that the element 32 is within predetermined limits movable relative the element 80 which due to the friction members 90 tends to follow the element 26 with the speed thereof.

Figure 5:
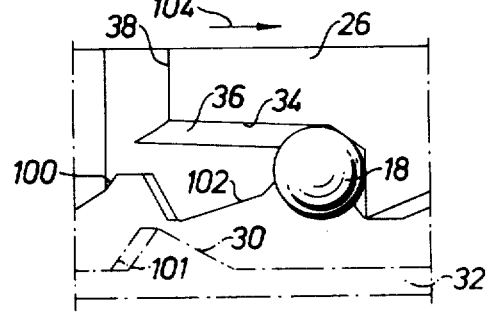

In addition the wire spring 92 makes sure that the balls 18 under all circumstances leave their positions according to FIG. 5 as soon as the direct drive comes to an end. When the spring 92 is unloaded and accelerates the element part 80 in the direction of rotation, the element 26 thus is imparted a thrust in forward direction so that the backward rolling movement of the balls along the guide surfaces 36 is started. This initiation of the rolling movement of the balls requires only a portion of the force stored in the spring 92.

While one more or less specific embodiment of the invention has been shown and described, it is to be understood that this is for purpose of illustration only and that the invention is not limited thereby, but its scope is to be determined by the appended claims.

What is claimed is:

1. Screw thread cutting apparatus, comprising a driving part, a driven part and clutch elements provided therebetween and having drivers which when transferring torque between said parts are in engagement with one another, but on excess of a predetermined value of said torque become disengaged by axial displacement of one of said elements against the action of spring members, torque transferring locking members being provided in recesses formed firstly in said one element and secondly in one of said parts, said recesses in said one element having portions extending in a peripheral direction and presenting guide surfaces for the locking members during axial movement thereof, said one element being under the action of friction members which upon disengagement brake said one element and transfer the locking members from the torque transferring positions into the guide surfaces for complete disengagement of the drivers, and wherein for the purpose of application of this device to a reversible screw thread cutting apparatus where the driving part always has the same direction of rotation, the other clutch element comprises two concentrically arranged element parts, which within limits are rotatable relative to one another, of which element parts one is disposed for cooperation with the friction members and the other is formed with drivers so as upon reversal of the apparatus to cause the last-mentioned element part to be accelerated to higher speed by the friction members assisted by the friction moment exerted on the first-mentioned element part thereby to ensure that the drivers of the two clutch elements always return to the clutch engagement position.

2. The screw thread cutting apparatus as claimed in claim 1, wherein a spring member is provided between the two element parts and is disposed to be loaded by the action of the moment produced by the friction members.

* * * * *